Patented June 29, 1943

2,322,886

UNITED STATES PATENT OFFICE 2,322,886

ADHESIVE AND METHOD OF MAKING THE SAME

Seymour G. Saunders, Bloomfield Hills, and Harry Morrison, Detroit, Mich., assignors to Chrysler Corporation, Highland Park, Mich., a corporation of Delaware No Drawing. Application February 14, 1940, Serial No. 318,842

11 Claims. (Cl. 260—5)

This invention relates to an improved adhesive and method of making the same.

More particularly, the invention pertains to an improved adhesive which is adapted for use in connecting together parts of an assembly including rubber and rubber-like substances or numerous other materials such as wood, fiber, fabric, metal and the like.

One of the main objects of the invention is the inclusion in an adhesive of this kind of a resinous constituent adapted to set by polymerization and which is thus not susceptible to softening under heat as are thermoplastic resins.

Another object of the invention is to provide in an adhesive of this character a hydrocarbon resinous constituent which imparts increased adhesive strength and increased wetting properties that enable the use of the adhesive on materials which have heretofore resisted wetting by numerous adhesives.

A further object of the invention is to provide an improved plasticiser in an adhesive of this kind which imparts plasticity thereto in its set state while making a marked increase in the tackiness of the adhesive in its unset state.

An additional object of the invention is the provision of a plasticising tackifier in a rubber cement type of adhesive which reduces the rubber content requirement of a composition of this kind and which accommodates the use of larger percentages of asphalt, thereby reducing the final cost of the material.

We have found that the foregoing objects may be accomplished and other advantages obtained in the manufacture of adhesives by the incorporation therein of a resin-like material, commercially known as "Petropol." Petropol is a hydrocarbon polymer resulting from the polymerization of the di-olefine constituent of a hydrocarbon distillate in the presence of a suitable polymerizing agent such as fuller's earth or sulphuric acid. The resulting polymerization product is reduced under steam and vacuum distillation to a heavier consistency of from 60% to 90% solids. This product has a high iodine value of 175 or above which denotes a high degree of unsaturation. These products are obtained by high temperature cracking of hydrocarbons at 1000° F. or above.

Petropol may be used to advantage in numerous rubber cements of diverse compositions. One adhesive composition embodying the invention may be compounded by heating together asphalt, rosin, ester gum and Petropol to a temperature of from 450° F. to 460° F. The foregoing ingredients are preferably present in the following proportions by weight: asphalt 33.5 pounds, rosin (colophony) 7.1 pounds, ester gum 7.1 pounds and Petropol 23.8 pounds. This heating operation may be conducted in any suitable kettle in which the materials are thoroughly fused together while substantially 28.5 pounds of rubber scrap, such as tire scrap or mechanical rubber scrap, are added in relatively small increments over a period of twenty minutes. During this twenty minute period, the temperature of the batch is raised from the above mentioned temperature to substantially 480° F. at the end of the addition of the scrap. The batch is vigorously stirred throughout this portion of the process and the heating and stirring is continued while the batch is held at substantially 480° F. for thirty minutes after completion of the addition of rubber scrap. At this stage in the process, the material of the batch is fairly homogeneous and thin.

The fused mass is then allowed to cool to substantially 230° F. and to it is added a mixture of fillers and accelerators such as iron oxide, sulphur, hydrated lime and zinc oxide. It has been found that the following proportions of fillers and accelerators by weight may be added, to advantage, to one hundred pounds of the base fused material: iron 3.8 pounds, sulphur 3.3 pounds, hydrated lime 2.9 pounds and zinc oxide 2.9 pounds. The resulting batch is continuously stirred thereafter while heated from 320° F. to 325° F. for substantially thirty minutes. After this treatment, the resulting material has a heavy body.

The thus reacted batch, which constitutes the base of the adhesive, is then rapidly cooled by pouring it into cold water or by placing it in a cooling mill and it is then cut with a suitable solvent to a desired consistency. A suitable solvent may comprise a solution of alcohol and naphtha, ethyl alcohol forming substantially 5% by weight of the naphtha. Other solvents or vehicles such as aviation gasoline and similar hydrocarbons may be used for this purpose. The amount of solvent added is optional and depends upon the desired viscosity. When naphtha and alcohol are employed, to the material derived after the last mentioned cooling step is preferably added substantially 80% of the total quantity of naphtha to be used and thereafter alcohol in an amount equal to substantially 5% of the total quantity of naphtha is thoroughly mixed with the naphtha cut product, the remaining 20% of the naphtha being added and thoroughly mixed thereafter.

In place of dissolving the above mentioned base material in a solvent, it may be dispersed in water for many types of applications. This may be accomplished by milling together suitable quantities of the base and reclaim rubber with subsequent addition of rosin and stearic acid. The milling operation is preferably continued until all lumps of rosin and stearic acid have disappeared. Rosin oil is then added to the milled mass and the latter is further milled for approximately ten minutes. Then a suitable quantity of trisodium phosphate is dispersed throughout the resulting mass by further mixing. During the foregoing mixing operation, the mass is heated sufficiently to facilitate intimate commingling of the constituents thereof and at the end of the mixing operation following addition of trisodium phosphate, the temperature should be from substantially 150° F. to 160° F.

The proportions of the above mentioned constituents may be varied. A suitable composition may, for example, comprise the following proportions:

| | Parts by weight |
|---|---|
| Base | 400 |
| Rosin | 40 |
| Rosin oil | 25 |
| Reclaim | 100 |
| Trisodium phosphate | 80 |
| Stearic acid | 12 |

When using the above composition, substantially 295 parts by weight of water are added in increments of five parts each until about three quarters of the total quantity of water have been introduced. The temperature of the mill is preferably so controlled during the addition of water as to be substantially at room temperature when the last of the above increments of water is added. The mass become "puffed up" in appearance at this stage of the process and operation of the mill is continued for about fifteen minutes. Then the remaining water is added in increments of five parts of the total. During addition of the first or second increments of water of the last quarter added, a phase shift occurs. Until this stage is reached, the water is dispersed in the base material, and after this stage the base material becomes dispersed in the water. After the phase shift, the mill may be cooled more rapidly to from 50° F. to 60° F. at the time of addition to the last increment.

The foregoing dispersion is stable and can be thinned to any desired consistency.

The resulting cement may appear to have a relatively low viscosity immediately after the cutting operation but on standing for from twenty-four to forty-eight hours, its viscosity becomes permanent and of operable consistency.

Certain modifications may, if desired, be made in the compounding of the cement such as by the addition of reclaimed rubber in an amount equal to substantially 30% of the weight of the entire mixture immediately prior to the cutting operation. The reclaim serves to increase the viscosity of the cement and add body thereto while at the same time materially increasing its adhesive strength. The tackiness of the cement may be further increased by the addition of cumar gum in an amount equal to substantially 10% of the weight of the batch immediately prior to the cutting operation. This addition may result in prolonging the setting time requirements.

During setting of the above described cement, the Petropol polymerizes to a set condition and thus when set is not susceptible to softening by heat as are compounds that are of thermoplastic nature. By employing this form of resinous material in an adhesive of the type employed to cement rubber containing parts together, it is possible to greatly reduce the rubber content of the cement without destroying the adhesive strength properties thereof, for the presence of Petropol enables the use of much higher percentages of asphalt, thus permitting a reduction in the rubber content of the composition. Petropol also so modifies the rosin and the resinates which result from the reactions between the rosin and the active agents of the accelerating and filling constituents as to prevent the resulting reaction product from brittle when the cement is in a set state.

Although specific proportions of the ingredients have been set forth in order to disclose a representative embodiment of the invention, it is obvious that various changes in the quantities of materials employed in the manufacture of the improved adhesive may be made.

Although but several specific embodiments of the invention have been herein described, it will be understood that various changes in the sequence of operations, steps and materials employed may be made without departing from the spirit of the invention.

We claim:

1. An adhesive comprising in its unset state a liquid vehicle and a solids content incorporated therein comprising a fused together mass of asphalt, resinous material having a main portion comprising hydrocarbon polymers resulting from polymerization of the di-olefine constituents of a hydrocarbon distillate and rubber.

2. An adhesive having a solids content comprising the reaction product of a mixture including iron oxide, sulphur, lime and zinc oxide with a fused together mass of asphalt, resinous material having a main portion comprising hydrocarbon polymers of a hydrocarbon distillate and rubber.

3. An adhesive having a solids content comprising the reaction product of a mixture including iron oxide, sulphur, lime and zinc oxide with a fused together mass of asphalt, resinous material having a main portion comprising ester gum and hydrocarbon polymers resulting from polymerization of the di-olefine constituents of a hydrocarbon distillate and rubber.

4. An adhesive having a solids content comprising the reaction product of a fused mass of asphalt, rosin, ester gum, rubber scrap and hydrocarbon polymers resulting from polymerization of the di-olefine constituents of a hydrocarbon distillate, with a combined filler and accelerator content.

5. A cement comprising the reaction product formed while in intimate mixture with iron and zinc oxides of a fused mass of asphalt, rubber and resinous material including a major portion of hydrocarbon polymers resulting from polymerization of the di-olefine constituents of a hydrocarbon distillate with sulphur and lime.

6. A cement comprising the reaction product of a fused fuming mass of asphalt, rubber and resinous material including a major portion of hydrocarbon polymers resulting from polymerization of the di-olefine constituents of a hydrocarbon distillate with sulphur and lime, and a volatile vehicle.

7. A cement comprising the reaction product of a fused fuming mass of asphalt, rubber in the form of tire scrap, and resinous material including a major portion of hydrocarbon polymers resulting from polymerization of the di-olefine constituents of a hydrocarbon distillate with sulphur and lime, said reaction product being formed while a metallic oxide accelerating agent is intimately mixed therewith.

8. A cement comprising the reaction product of a fused fuming mass of asphalt, rubber in the form of tire scrap, and resinous material including a major portion of hydrocarbon polymers resulting from polymerization of the di-olefine constituents of a hydrocarbon distillate with sulphur and lime, said reaction product being formed while a metallic oxide accelerating agent is intimately mixed therewith and a plasticising constituent comprising cumar gum and reclaim rubber.

9. The method of making an adhesive composition which comprises the steps of fusing together asphalt, rosin, ester gum, rubber and a hydrocarbon polymer resulting from polymerization of di-olefine constituents of a hydrocarbon distillate, reacting the resulting product while in a fused state with iron oxide, sulphur, hydrated lime and zinc oxide, and diluting the final product with a volatile solvent.

10. The method of making an adhesive composition which comprises the steps of fusing together at from 450° F. to 460° F. asphalt, rosin, ester gum and hydrocarbon polymers resulting from polymerization of the di-olefine constituents of a hydrocarbon distillate, adding rubber scrap in comparatively small increments over a period of substantially twenty minutes during increasing of the temperature of the batch from said above mentioned value to substantially 480° F. at the end of said twenty minute period, continuing heating of said batch at said last mentioned temperature for substantially thirty minutes, cooling said batch thereafter to from 320° F. to 325° F., introducing a mixture of iron oxide, sulphur, hydrated lime and zinc oxide into said batch and maintaining the temperature of the combined batch at 320° F. to 325° F. for substantially thirty minutes, rapidly cooling the resulting product thereafter, and cutting said product in a volatile vehicle.

11. The method of making an adhesive composition which comprises the steps of fusing together at from 450° F. to 460° F. asphalt 33.5 parts by weight, rosin 7.1 parts by weight, ester gum 7.1 parts by weight and hydrocarbon polymers resulting from polymerization of the di-olefine constituents of a hydrocarbon distillate 23.5 parts by weight; adding 28.5 parts by weight of rubber scrap in small increments over a period of substantially thirty minutes during increasing of the temperature of the resulting batch to substantially 480° F. at the end of said twenty minute period; continuing heating of said batch at said last mentioned temperature for substantially thirty minutes; cooling said batch thereafter to substantially 320° F.; introducing into each 100 lbs. of said batch a mixture comprising 3.8 pounds of iron oxide, 3.3 pounds of sulphur, 2.9 pounds of hydrated lime and 2.9 pounds of zinc oxide and maintaining the temperature of said batch at 320° F. to 325° F. for substantially thirty minutes; cooling the resulting product thereafter to normal atmospheric temperature, and cutting said product in a volatile vehicle.

SEYMOUR G. SAUNDERS.
HARRY MORRISON.